(12) United States Patent
Gonzalez

(10) Patent No.: US 9,113,597 B1
(45) Date of Patent: Aug. 25, 2015

(54) HAY RETRIEVING APPARATUS

(71) Applicant: Santiago Ponce Gonzalez, Goodyear, AZ (US)

(72) Inventor: Santiago Ponce Gonzalez, Goodyear, AZ (US)

( * ) Notice: Subject to any disclaimer, the term of this patent is extended or adjusted under 35 U.S.C. 154(b) by 185 days.

(21) Appl. No.: 13/745,531

(22) Filed: Jan. 18, 2013

(51) Int. Cl.
*A01D 87/12* (2006.01)

(52) U.S. Cl.
CPC .................... *A01D 87/126* (2013.01)

(58) Field of Classification Search
USPC ............... 414/469, 111, 491, 514, 554–556, 414/473–479, 471, 486, 541, 540
See application file for complete search history.

(56) References Cited

U.S. PATENT DOCUMENTS

| | | |
|---|---|---|
| 3,972,308 A | 8/1976 | Ray |
| 4,619,570 A | 10/1986 | Siebenga |
| 5,211,345 A | 5/1993 | Siebenga |

*Primary Examiner* — Kaitlin Joerger
(74) *Attorney, Agent, or Firm* — Rodney J. Fuller; Booth Udall Fuller, PLC

(57) ABSTRACT

A hay retrieving apparatus for use with a vehicle is disclosed herein. The hay retrieving apparatus may include a base frame, a rear wall frame coupled to the base frame, carriage assembly, and a fork assembly coupled to carriage assembly. The base frame and carriage assembly are configured to pivotally couple to a vehicle frame and move from horizontal positions to vertical positions. The carriage assembly is also configured to pivot with the base frame, pivot independent of the base frame, or both. The fork assembly is designed to move from one end of the carriage end to the opposing end of the carriage assembly during operation. The fork assembly includes two arms that are movable to increase and decrease the distance between the two arms.

20 Claims, 10 Drawing Sheets

HAY RETRIEVING APPARATUS

BACKGROUND

1. Technical Field

Aspects of this document relate generally to apparatuses for lifting, moving, or otherwise transporting bales of hay.

2. Background Art

Various types of vehicles are frequently used to transport bales of hay. Vehicles used in the transport of hay typically include flatbeds or hay retrievers. As the name implies, flatbed vehicles usually include a truck with a flatbed that requires a forklift or other device to stack bales of hay on the flat bed before the bales of hay are transported. Hay retrievers typically include a bed that pivots from the truck frame to secure a fixed amount of hay bales in a stack before pivoting back to the truck frame. Hay retrievers, however, are limited to a specific number of hay bales present in a stack. Moreover, the structure of the bed in previous hay retrievers limits the pivoting movement of the bed, thus confining the functionality of the hay retriever to relatively few uses.

SUMMARY

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The present invention is directed to a hay retrieving apparatus for use with a vehicle. The hay retrieving apparatus preferably comprises a base frame, a rear wall frame, at least one pivot element, a carriage assembly, and a fork assembly.

The base frame typically comprises a rear member and two side members each coupled to substantially opposing ends of the rear member and the rear wall frame is preferably coupled to the base frame proximate the rear member. The at least one pivot element is preferably coupled to the side members distal to the rear member and configured to pivotally couple the base frame to a vehicle frame such that the base frame is pivotable between a substantially horizontal first frame position and a substantially vertical second frame position.

The carriage assembly is advantageously configured to pivotally couple to the vehicle frame proximate the pivot elements and pivot between a substantially horizontal first carriage position and a substantially vertical second carriage position when pivotally coupled to vehicle frame, wherein the carriage assembly is configured to pivot with the base frame, to pivot independent of the base frame, or both, when the carriage assembly and the base frame are coupled to the vehicle frame.

The fork assembly is preferably coupled to the carriage assembly and comprises at least two opposing arms perpendicular to the carriage assembly. The at least the fork assembly is movably coupled to the carriage assembly or the rear wall frame is movably coupled to the base frame, such that a distance between the rear wall frame and the arms of the fork assembly is increased or decreased when either the fork assembly or the rear wall frame is moved and the carriage assembly is substantially parallel to the side members.

In one particular aspect, the fork assembly is configured to move the two opposing arms directionally closer in and farther out from each other.

In yet another, the rear wall frame is fixed and the fork assembly is movably coupled to the carriage assembly and the at least one pivot element comprises two pivot elements.

In a specific embodiment of the hay retrieving apparatus, the carriage assembly comprises two carriage frame members; and the fork assembly comprises a fork body slidably coupled to the carriage assembly and two hydraulic elements coupled to the fork body, each hydraulic element coupled to a different arm of the two opposing arms, wherein the carriage assembly is configured to move the two opposing arms from a first position proximate a first carriage end to a second position closer to the second carriage end.

The carriage assembly may further comprises two extension frame members coupled by a cross brace, each extension frame member slidably coupled to a different carriage frame member such that the extension frame members are movable between an extended position and an unextended position; and/or the fork body maybe slidably coupled to the extension frame members and the carriage assembly further comprises a carriage hydraulic element coupled to the carriage assembly between the carriage frame members and configured to move the fork body along the extension frame members.

In certain implementations of the invention, the hay retrieving apparatus further comprises a locking mechanism configured to lock the carriage assembly to the base frame such that the carriage assembly and base frame pivot jointly.

The hay retrieving apparatus may also optional comprises at least one frame hydraulic element coupled to the carriage assembly and configured to couple to the vehicle frame such that the at least one frame hydraulic element pivots the carriage assembly when the carriage assembly and the at least one frame hydraulic element are coupled to the vehicle frame.

In a different embodiment, the invention is directed to a hay retrieving apparatus comprising: a base frame, the base frame comprising a rear member and two side members each coupled to opposing ends of the rear member; a rear wall frame coupled to the base frame proximate the rear member; at least two pivot elements each coupled to a different side member opposite the rear member, the pivot elements each configured to pivotally couple the base frame to a vehicle frame of the vehicle and pivotable between a substantially horizontal first frame position and a substantially vertical second frame position; and a fork assembly configured to pivotally couple to the vehicle frame and movable to increase or decrease a distance between the rear wall frame and the fork assembly, the fork assembly comprising a fork body, two extension members coupled to the fork body, and two arms each coupled to a different extension member. In this embodiment, the extension members are preferably configured to move the two opposing arms directionally closer to and further from each other.

In certain aspects of this embodiment of the hay retrieving apparatus, the fork body is slidably coupled to a carriage assembly configured to pivotally couple to the vehicle frame proximate the pivot elements and pivot between a substantially horizontal first carriage position to a substantially vertical second carriage position, wherein the carriage assembly is configured to pivot with the base, to pivot independent of the base, or both, when the carriage assembly and the base frame are coupled to the vehicle frame.

The invention is also directed to a hay retriever. The hay retriever comprises a base frame, a rear wall frame, at least one pivot element, a carriage assembly, a fork assembly; and a lifting element.

Preferably the base frame, the base frame comprising a rear member and at least two side members coupled to the rear member. The rear wall frame is coupled to the base frame proximate the rear member. The at least one pivot element is typically coupled to the side members distal to the rear member. The pivot element configured to pivotally couple the base frame to a vehicle frame such that the base frame is pivotable between a substantially horizontal first frame position and a substantially vertical second frame position.

The carriage assembly is preferably pivotally coupled to the vehicle frame proximate the at least one pivot element such that the carriage assembly is pivotable between a substantially horizontal first carriage position and substantially vertical second carriage position. The carriage assembly is configured to pivot with the base frame, to pivot independent of the base frame, or both; the fork assembly movably coupled to the carriage assembly. The fork assembly preferably comprises two opposing arms perpendicular to the carriage assembly and movable between a first position proximate a first end of the carriage assembly and a second position closer to a second end of the carriage assembly. The lifting element is preferably coupled to the vehicle frame and carriage assembly and configured to pivot the base frame and carriage assembly.

For particular implementations of the hay retriever: the fork assembly may comprise extendable members configured to move the two opposing arms directionally closer to and further from each other; the lifting element and the extendable members may each comprise hydraulic elements; the carriage assembly may further comprise an extendable carriage assembly; optionally, the hay retriever may also comprise a releasable locking mechanism configured to lock the carriage assembly to the base; and/or the rear wall frame is fixed and the fork assembly is movably coupled to the carriage assembly with the at least one pivot element comprising two pivot elements.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

Figure 1:
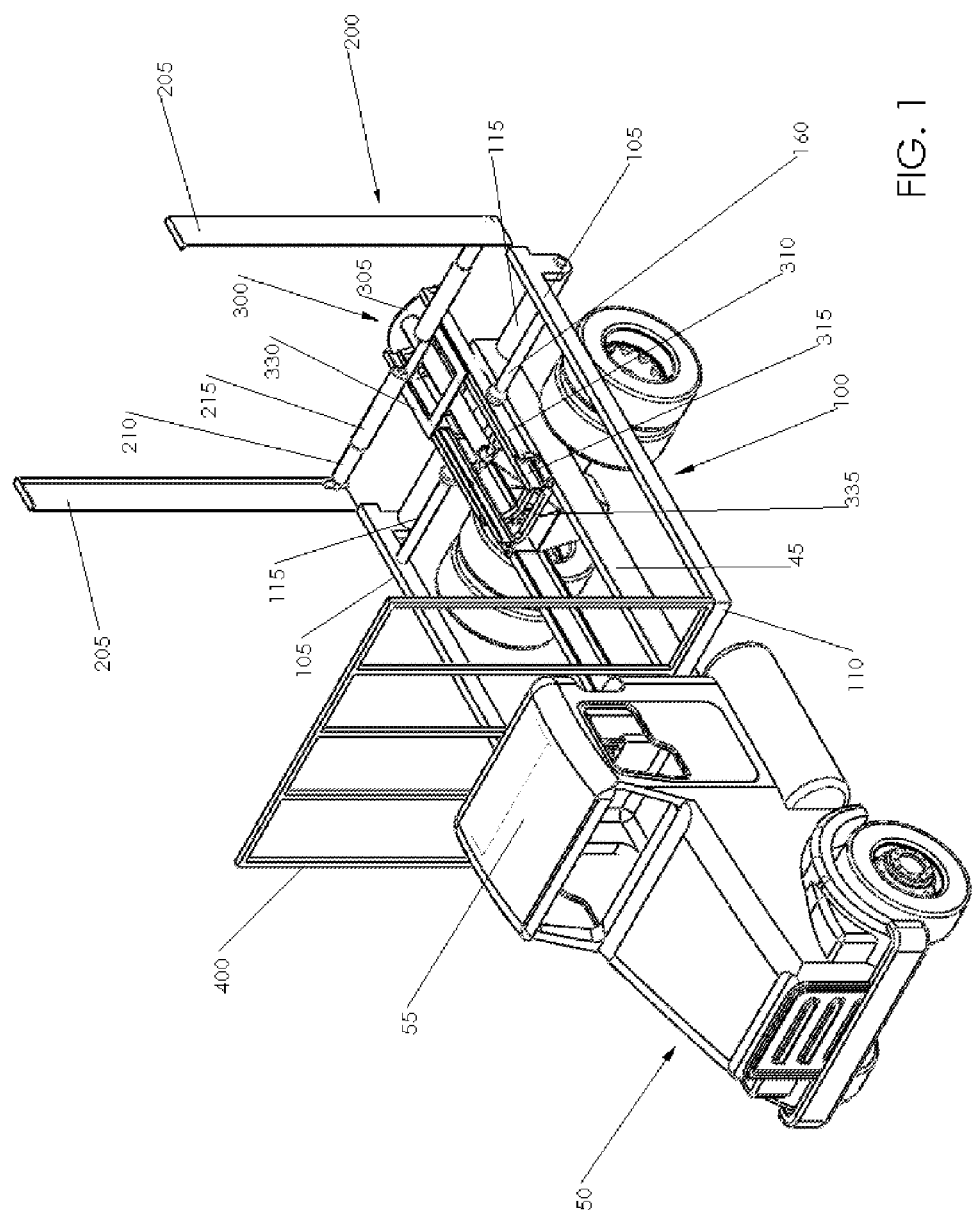
FIG. 1 is a perspective view of a hay retriever with both the base frame and the carriage assembly in horizontal positions.

This disclosure, its aspects and implementations, are not limited to the specific components or assembly procedures disclosed herein. Many additional components and assembly procedures known in the art consistent with the intended hay retriever and/or assembly procedures for a hay retriever will become apparent for use with implementations of a hay retriever from this disclosure. Accordingly, for example, although particular hay retrievers are disclosed, such hay retrievers and implementing components may comprise any shape, size, style, type, model, version, measurement, concentration, material, quantity, and/or the like as is known in the art for such hay retrievers and implementing components, consistent with the intended operation of hay retrievers.

Various aspects of embodiments disclosed herein assist in the retrieval, loading, and/or unloading of baled hay. As such, embodiments of disclosures presented herein are, in one aspect, associated with a vehicle 50 capable of holding and transporting bales of hay. As shown in FIGS. 1-8, the vehicle 50 may comprise any vehicle configured to couple to various embodiments of the base frame 100, carriage assembly 300, and/or the fork assembly 200 presented herein. In a particular embodiment, the vehicle 50 comprises at least two vehicle beams 45 extending from a rear of the vehicle to at least the vehicle cab 55. Vehicle beams 45 typically comprise metal beams known in the art.

In one aspect, vehicle 50 comprises a rear axle 40 coupled to the vehicle beams 45 opposite the vehicle cab 55. Rear axle 40 is typically located near the rear of the vehicle 50, but may, in various embodiments, be located anywhere along the vehicle beams 45. Rear axle 40 is coupled to a plurality of wheels that may, in some embodiments, be in mechanical communication with a vehicle engine. Similarly, vehicle 50 further comprises a front axle proximate the vehicle cab 50. Front axle 40 is likewise coupled to a plurality of wheels that may, in some embodiments, be in mechanical communication with the vehicle engine. The vehicle engine and/or battery may power the vehicle and any associated hydraulic or mechanical lifts through a variety of mechanisms known in the art.

In an embodiment, the hay retriever 10 comprises a base frame 100 coupled to the at least two vehicle beams 45. According to one aspect, base frame 100 comprises a pivot elements 115 coupled to vehicle beams 45 proximate the rear of the vehicle 50. In such an aspect, the base frame 100 further comprises two opposing side members 105 that are coupled to or otherwise extend from pivot elements 115 to a rear member 110.

In another embodiment, hay retriever 10 comprises a base frame 100 with two base beams that align with the vehicle beams 45 when the base frame 100 is in a horizontal first frame position 150. Although reference is made to a base frame 100 comprising two base beams, embodiments comprising one, two, three, four, or more base beams 150 are also contemplated. In one aspect, the base beams are coupled to the rear member 110 and the pivot elements 115 between the rear member 110 and the pivot elements 115.

An embodiment comprising base beams may further comprise two opposing side members 105 similarly coupled to the rear member 110 and the pivot elements 115 between the rear member 110 and the pivot elements 115. While base beams are typically more centrally located relative the pivot elements 115, side members 105 are typically located on opposing ends of pivot elements 115. In other embodiments, however, base beams may be situated or otherwise located anywhere between opposing ends of the pivot elements 115 and/or rear member 110. Although included in most embodiments of base frame 100, rear member 110 is not required in some embodiments.

According to various aspects, rear member 110 comprises one continuous rear member 110 that extends between side members 105, or alternatively two separate rear members 110. In an embodiment comprising two separate rear members 110, each rear member 110 is typically coupled to a side member 105 and either a vehicle beam 45 or a base beam. Furthermore, any of the embodiments disclosed throughout this document may further comprise additional cross beams, support members, and the like on base frame 100 that provide structural support necessary in use of the base frame 100 in retrieving and hauling bales of hay.

Figure 2:
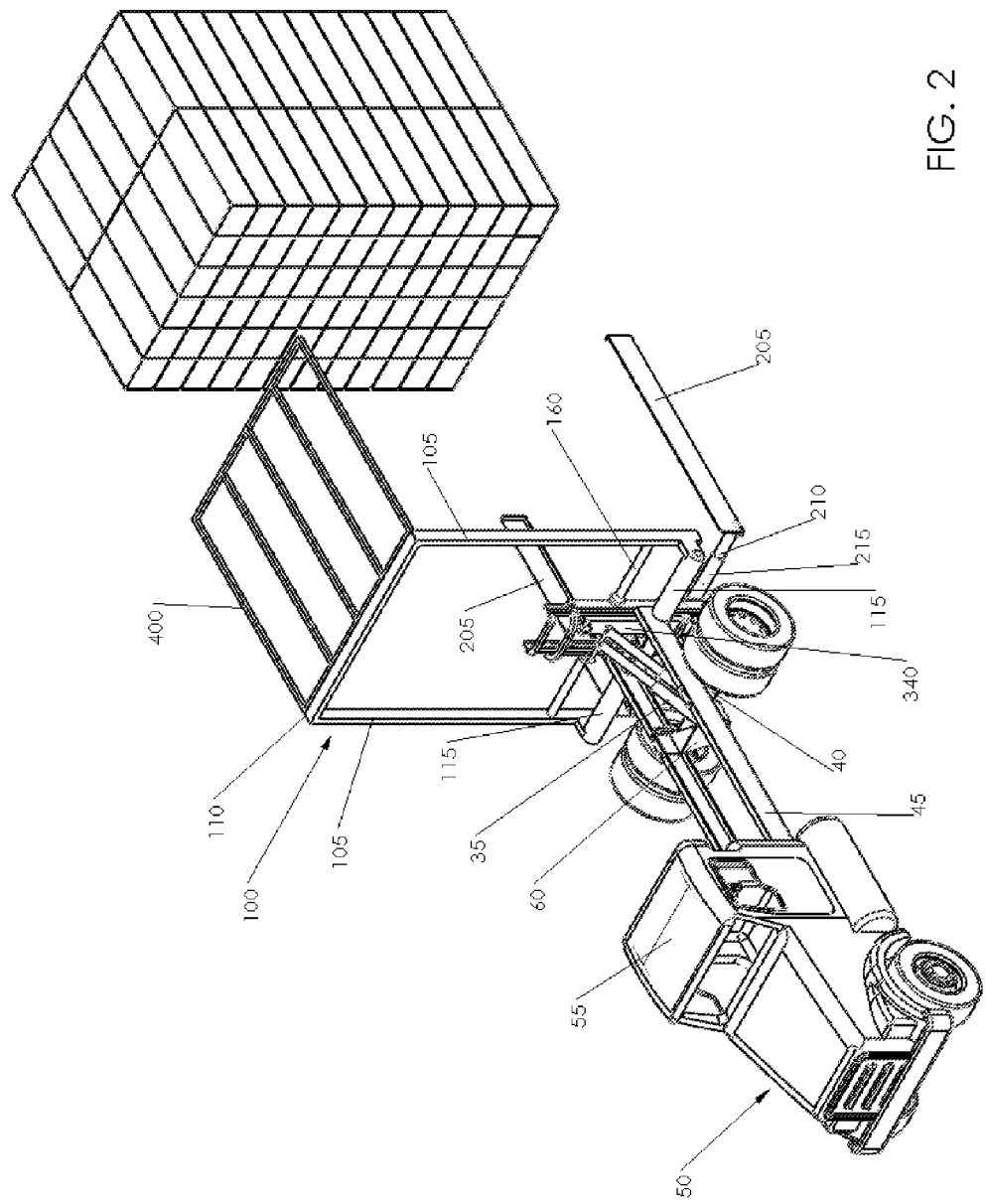
FIG. 2 is a perspective view of a hay retriever with both the base frame and the carriage assembly in vertical positions as the hay retriever approaches a stack of hay bales.
Figure 3:
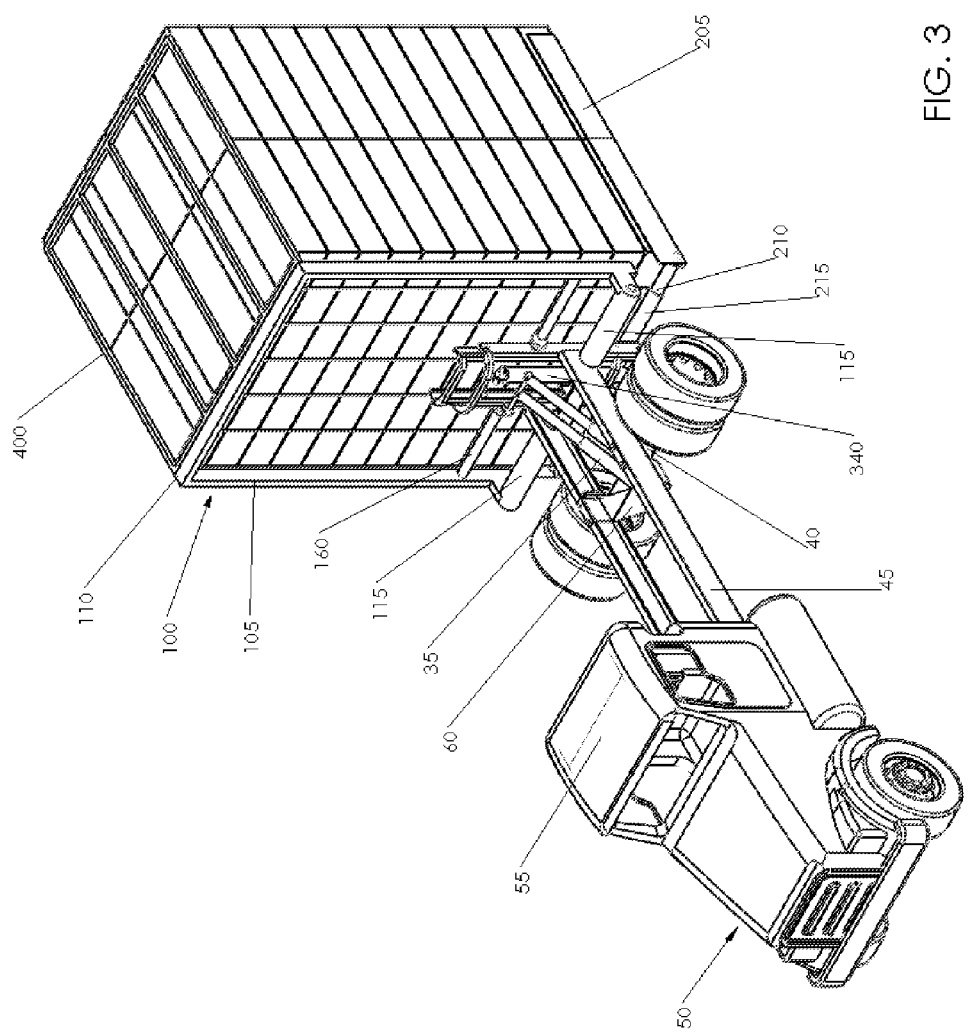
FIG. 3 is a perspective view of a hay retriever with both the base frame and the carriage assembly in vertical positions and with a stack of hay bales between a rear wall frame and fork assembly.
Figure 4:
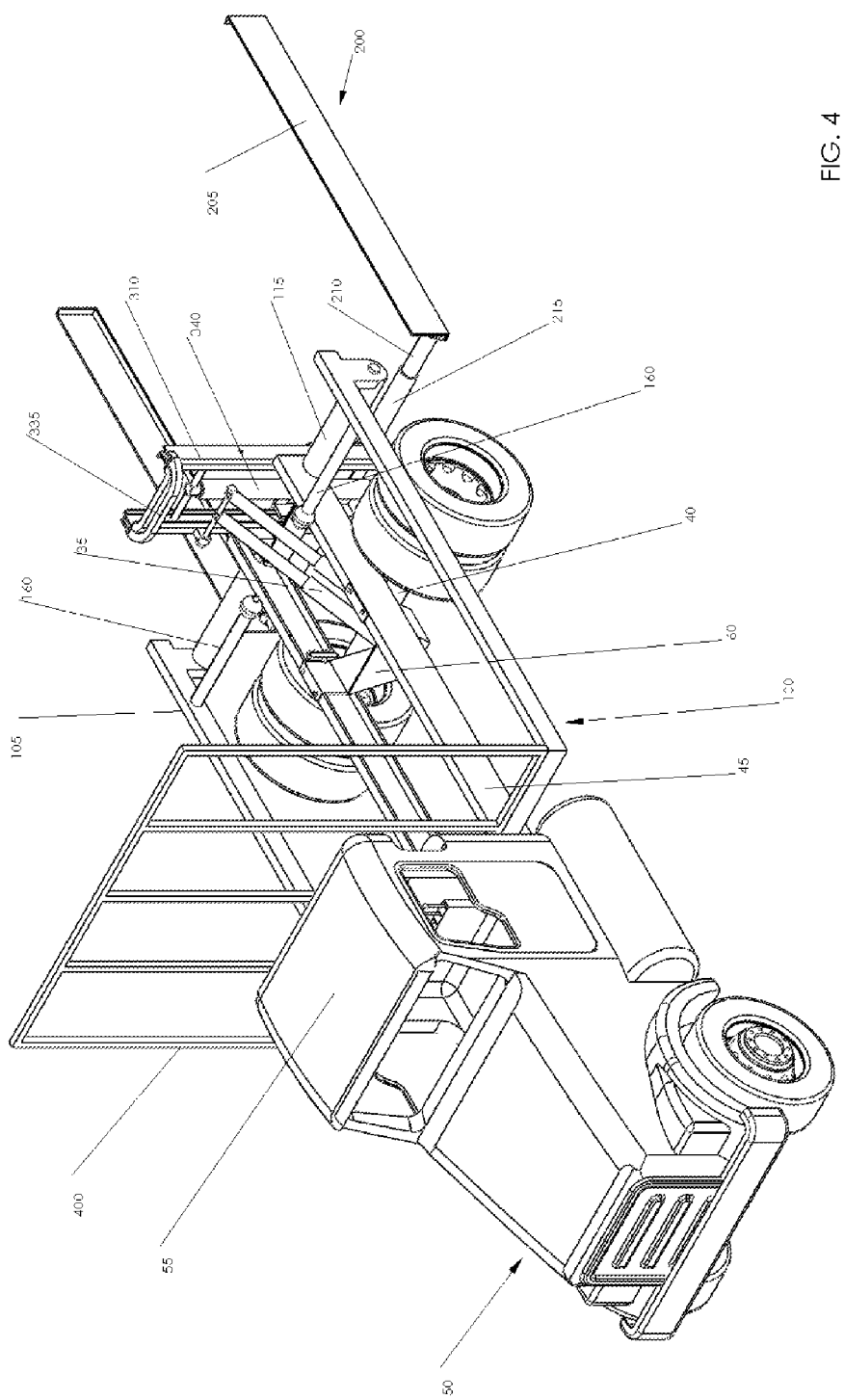
FIG. 4 is a perspective view of a hay retriever with a carriage assembly in a vertical position, a base frame in a horizontal position, and a fork assembly in a lowered position.

In an embodiment, hay retriever 10 further comprises a lifting element 35 coupled to the vehicle 50 and configured to pivot or otherwise move base frame 100 from a substantially horizontal first frame position (shown in FIG. 1) to a substantially vertical second frame position (shown in FIG. 2). Typically, lifting element 35 is coupled to vehicle beams 45. In the embodiments shown in FIG. 1-9, however, lifting element 35 is coupled to a lift mount 60 that extends between vehicles beams 45. Lifting element 35 may comprise any type of lifting device or apparatus, such as but not limited to a hydraulic lift, a chain lift, and the like. In a particular embodiment, two hydraulic cylinders are coupled to the vehicle 50 proximate to the rear axle 40. As the piston rods extend, the base frame 100 rotates or pivots to the substantially vertical second frame position shown in FIG. 2. As the piston rods refract, the base frame 100 returns to the substantially horizontal first frame position shown in FIG. 1.

In an embodiment, hay retriever 10 further comprises a rear wall frame 400. One aspect of the rear wall frame 400 comprises vertical beams, diagonal beams, and horizontal beams. The rear wall frame 400 is, in some embodiments, movably coupled to the base frame 100 such that the rear wall frame 400 is moveable between a first rear wall frame position proximate to the rear member 110 to a second rear wall frame position distal to the rear member 110.

In an embodiment, rear wall frame 400 couples to base frame 100 with sleeves coupled to the opposing side members 105. For example, a sleeve on each side of the rear wall frame 400 surrounds a portion of one of the opposing side members 105 and is configured to slide along the respective side members 105. When each of the two sleeves on the rear wall frame 400 slide or otherwise move along the respective opposing side members 105, the rear wall frame 400 moves between a first rear wall frame position and a second rear wall frame position. The first rear wall frame position and the second rear wall frame position may be located anywhere along the opposing side members 105. In a particular embodiment, the first rear wall frame position is proximate to the rear member 110, and the second rear wall frame position is distal to the rear member 110 near the end of opposing side members 105 opposite the rear member 110.

In one aspect, the sleeves comprise a hole or aperture shaped to allow passage of one of the side members 105 through the hole or aperture. The hole or aperture on sleeve may, in some embodiments, be shaped similar to the cross section of the opposing side members. Typically, the sliding motion of the sleeves of rear wall frame 400 is enabled by wheels coupled to the sleeves and in contact with opposing side members 105. In other embodiments, the movement of the sleeves of rear wall frame 400 is accomplished without wheels.

The sliding motion that moves sleeves along opposing side members 105 is typically powered by hydraulic cylinders. As the piston rods contract, the wheels roll or the sleeves slide along opposing side members 105 causing the rear wall frame 400 to move from first rear wall frame position 450 proximate to the vehicle cab 55 to the second rear wall frame position distal to the vehicle cab 55. As the piston rods extend, the wheels roll in the opposite direction returning the rear wall frame 400 to the first rear wall frame position. The controls for such motion are within vehicle 50. In other embodiments, the sliding motion of the sleeves along opposing side members 105 is accomplished through other mechanical mechanisms, such as, but not limited to, gears, chains, levers, and the like.

In another embodiment, rear wall frame 400 couples to base beams 120 in a similar manner as rear wall frame 400 may couple to opposing side members 105. Accordingly, sleeves may interact or otherwise slide along base beams. In yet another embodiment, base beams may comprise extendable pistons which couple to rear wall frame 400.

In an embodiment, hay retriever 10 further comprises carriage assembly 300. In one aspect, carriage assembly 300 couples to base frame 100 at the front member 115. Carriage assembly 300 is rotatable between a substantially horizontal first carriage position (shown in FIG. 1) and a substantially vertical second carriage position (shown in FIGS. 3 and 4). In a preferred embodiment, carriage assembly 300 can rotate either in conjunction with base frame 100 or independently.

Figure 9:
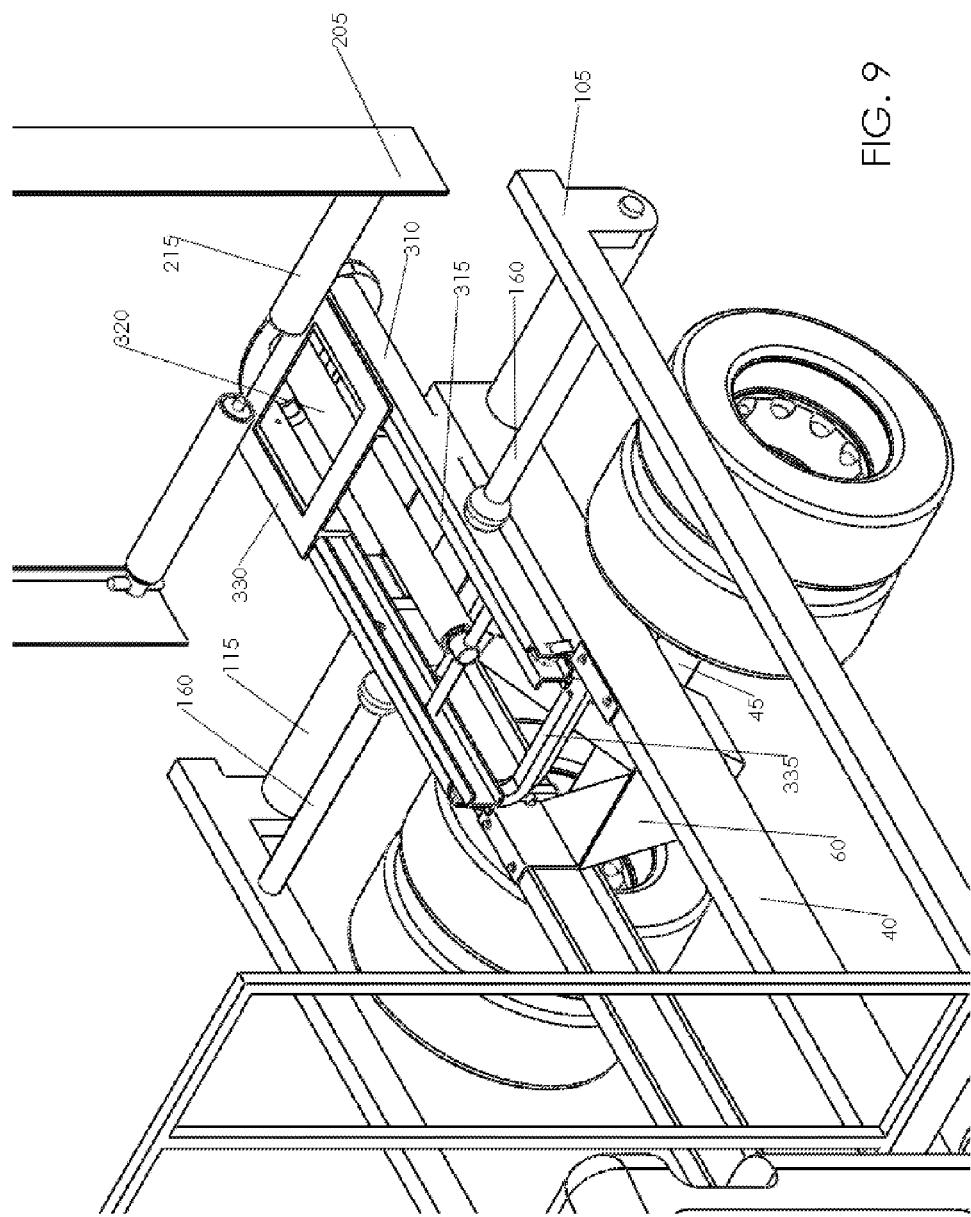
FIG. 9 is a close-up perspective view of a carriage assembly.
Figure 10:
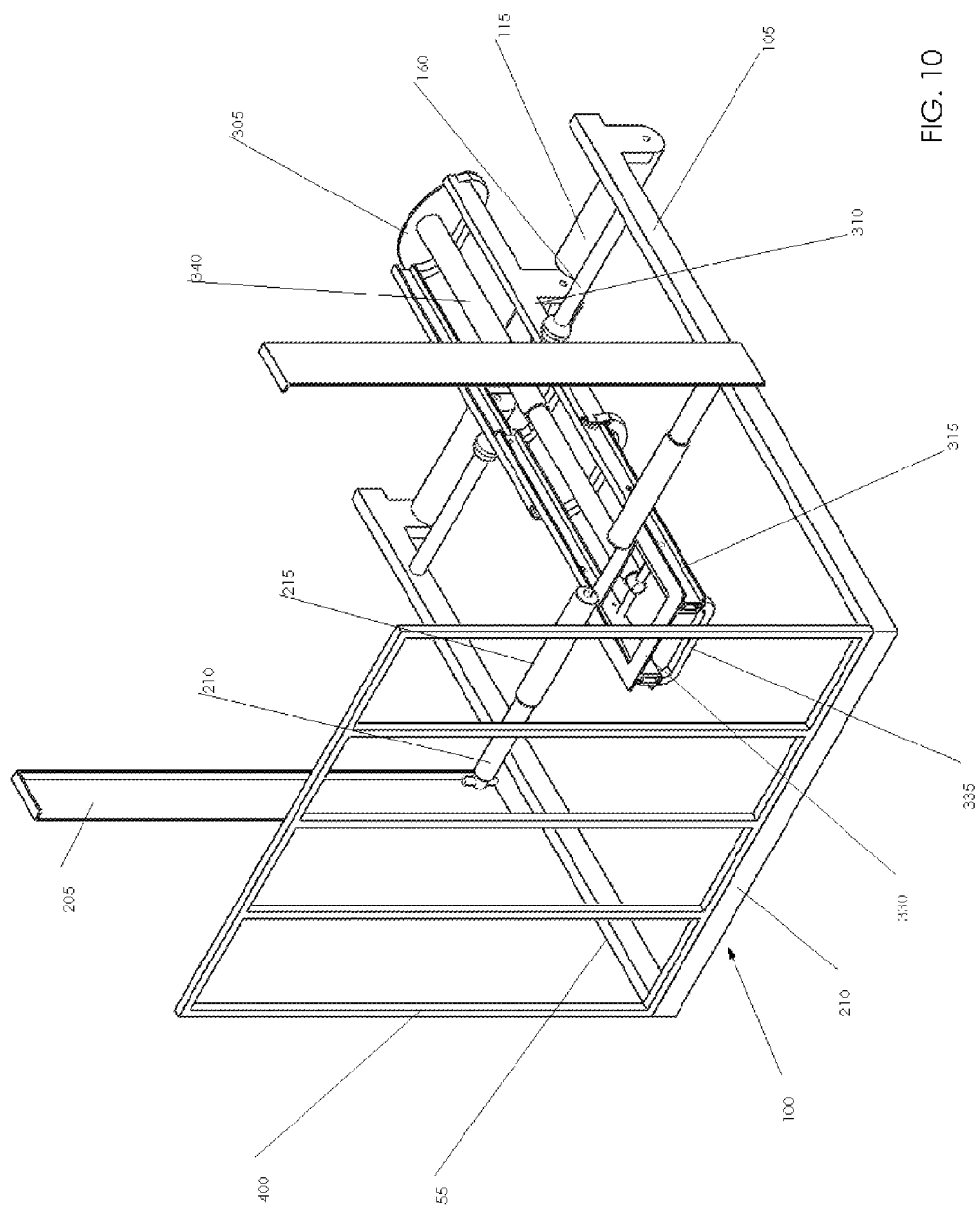
FIG. 10 is a perspective view of base frame, rear wall, carriage assembly, and fork assembly.

As shown in FIG. 9, an embodiment of hay retriever 10 comprises two locking mechanisms 160. According to one aspect, each locking mechanism 160 extends between a side member 105 and a carriage frame member 310 of the carriage assembly 300. When the locking mechanism 160 is in a locked position, the base frame 100 and the carriage assembly 300 rotate simultaneously at the same rate as the lifting element 35 lifts the carriage assembly. When the locking mechanism 160 is in an unlocked position, the only the carriage assembly 300 rotates or pivots, while the base frame 100 remains effectively motionless. When in an unlocked position, the locking mechanism 160 is disengaged from the carriage assembly. In various embodiments, the locking mechanisms 160 may comprise an air brake assembly, an electric locking mechanism, or a hydraulic powered locking mechanism. In a specific embodiment, the locking mechanisms 160 comprise air brake assemblies that utilize the vehicles brake compressor. The base frame 100 and/or the carriage assembly 300 may further comprise holes or other attaching components configured to couple with a pin of the locking mechanisms 160.

As further shown in FIG. 9, in an embodiment, carriage assembly 300 comprises a base plate 305, at least two carriage frame members 310, at least two extension frame members 315, at least one carriage hydraulic cylinder 320, a fork body 330, and at least one cross brace 335. The base plate 305 is typically coupled to the carriage frame members 310, which extend perpendicularly from the same inward side of the base plate 305. Although two carriage frame members 310 are typically utilized, carriage assemblies 300 utilizing more than two carriage frame members 310 are also contemplated. Carriage frame members 310 are, in one aspect, also coupled to the lifting element 35 previously described.

In a particular embodiment, carriage assembly 300 further comprises extension frame members 315 configured to extend the length of carriage assembly 300. In a particular aspect of such an embodiment, carriage frame members 310 are coupled to extension frame members 315 such that the extension frame members 315 slide along carriage assembly wheels 360 to extend from and retract into the carriage frame members 310. In other aspects, carriage assembly wheels 360 are not necessary for extension frame members 315 to slide along carriage frame members 315.

Figure 5:
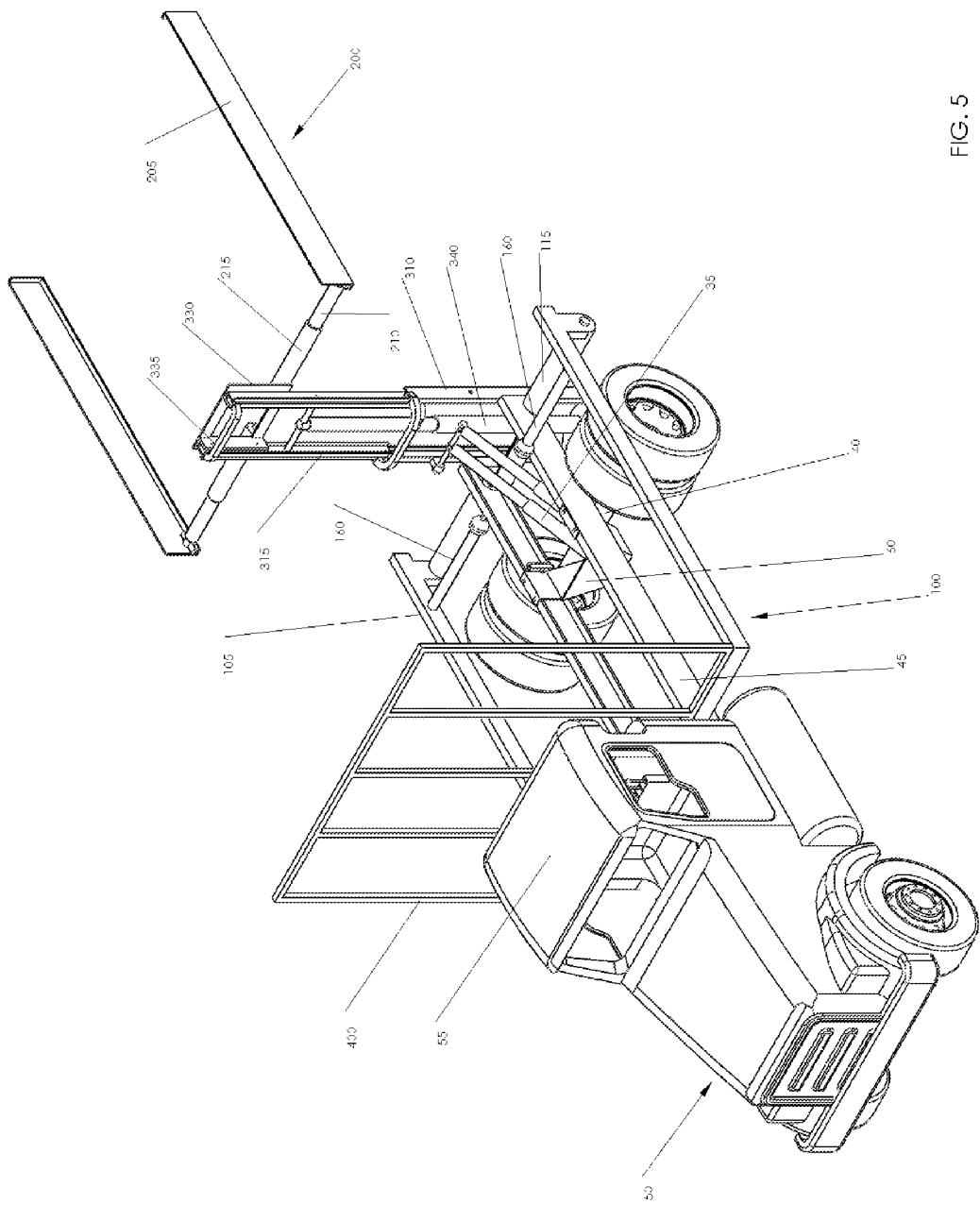
FIG. 5 is a perspective view of a hay retriever with a carriage assembly in a vertical position, a base frame in a horizontal position, and a fork assembly in a raised position.
Figure 6:
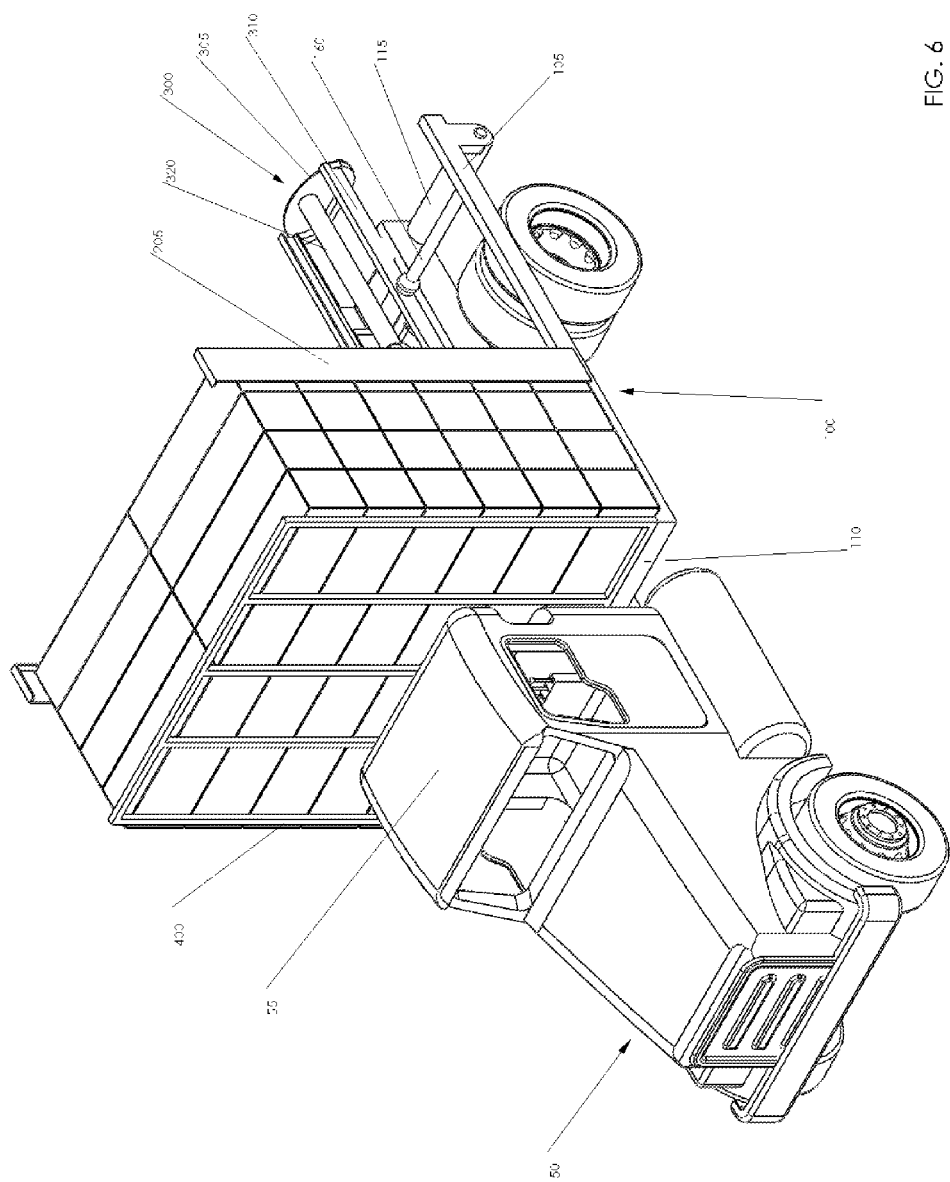
FIG. 6 is a perspective view of a hay retriever with both a base frame and a carriage assembly in horizontal positions, and a fork assembly in a raised position.

At least one cross brace 335 may also be included in carriage assembly 300 to support the carriage frame members 310. Fork body 330 couples to the extension frame members 315 such that fork body 330 may slide along the extension frame members 315. As shown in FIGS. 5 and 9, one embodiment utilizes at least one hydraulic element 340 mounted to the carriage assembly 300 to extend and retract the extension frame members 315, as well as move the fork body 330 along the extension frame member 315 or the carriage frame members 310. In some embodiments, carriage frame members 310 and extension frame members 315 comprise C-channels that, in combination with rollers, allow extension frame member 315 to extend from carriage frame members 310 as hydraulic element 340 extends.

Fork body 330 is typically slidably coupled to extension frame members 315 and moves in mechanical cooperation with extension or retraction of extension frame members 315. For example, movement of hydraulic element 340 may, in some embodiments, actuate a chain and pulley system that moves the fork body 330 and the extension frame members 315. In other embodiments, hydraulic element 340 may directly move extension frame members 315, and the chain and pulley system may responsively move the fork body 330 along extension frame members 315. In still other embodiments, movement of extension frame members 315 and fork body 330 is accomplished through any other movement mechanisms apparent to one having skill in the art.

Hydraulic element 340 typically includes a hydraulic housing and a hydraulic piston that, upon actuation, extends out from the hydraulic housing. In a preferred embodiment carriage hydraulic extension 340 is a 48 inch stroke hydraulic cylinder, though other modes of power may also be used. In other embodiments, a chain lift or a series of gears may be utilized to move extend and retract the extension frame members 315 and/or move the fork body 330.

In an embodiment, carriage assembly 300 also couples to fork assembly 200. In a preferred embodiment fork assembly 200 is coupled to carriage assembly 300 via fork body 330. Fork assembly 200 comprises two fork hydraulic cylinders 210 which extend horizontally from the fork body 330 in opposite directions and two arms 205 which extend from the fork hydraulic cylinders 210 at a 90 degree angle, the two arms 205 and the fork hydraulic cylinders 210 forming a plane perpendicular with the plane of the carriage assembly 300.

Figure 7:
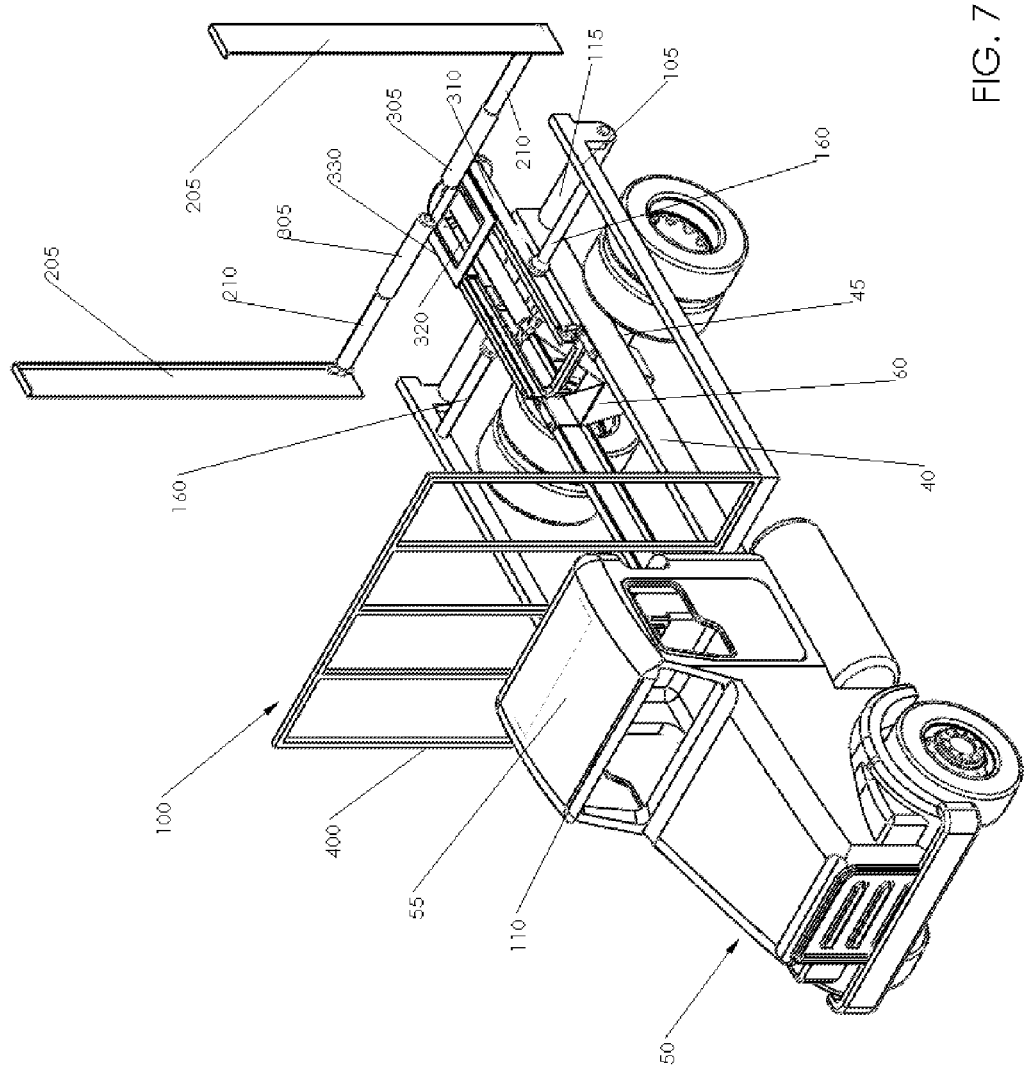
FIG. 7 is a perspective view of a hay retriever with both a base frame and a carriage assembly in horizontal positions, and arms of a fork assembly in a fully extended position.
Figure 8:
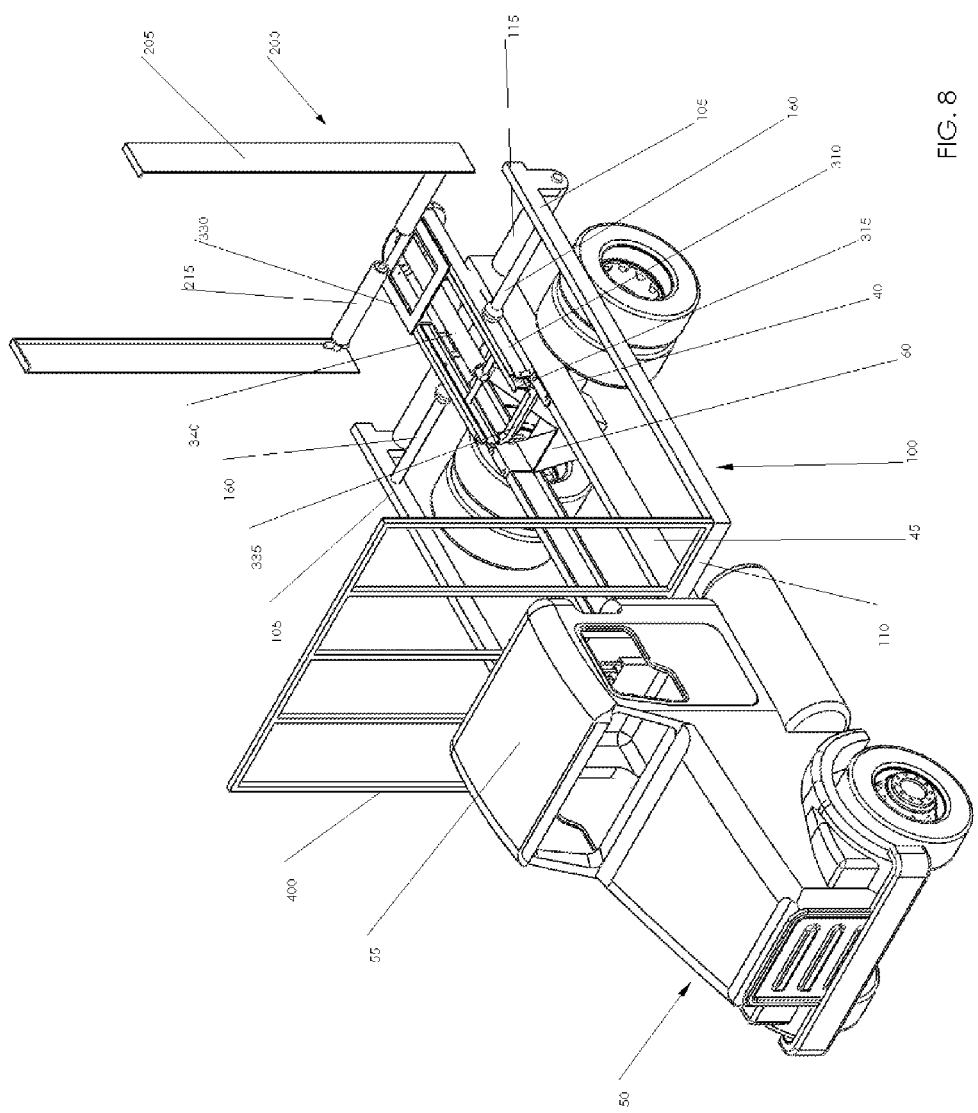
FIG. 8 is a perspective view of a hay retriever with both a base frame and a carriage assembly in horizontal positions, and arms of a fork assembly in unextended positions.

In a preferred embodiment the two fork hydraulic cylinders 210 in hydraulic housings 215 are 30 inch stroke hydraulic cylinders, though other modes of power may also be used. As shown in FIGS. 7 and 8, operation of the fork hydraulic cylinders 210 moves the arms 205 laterally such that the distance between the arms 205 may be increased or decreased. The arms 205 also move parallel with the plane of the carriage assembly 300 in conjunction with the movement of the fork body 330 and the extension frame members 315. FIG. 8 illustrates arms 205 in a first or narrowed fork assembly position, with the arms 205 closer to the base plate 305. FIG. 7 illustrates arms 205 have moved to a second or wider fork assembly position, with the arms 205 further from each other and base plate 305. In a preferred embodiment the two arms 205 have an L-shaped cross section.

In an embodiment, the rear wall frame 400 further comprises two cords coupled to the rear wall frame which are attachable to the ends of arms 205. Cords are adjustable to different lengths and may comprise any type of cord, such as, but not limited to, ropes, chains, cables, straps, or like cords known in the art.

In a preferred embodiment the hay retriever 10 may be used for retrieving a hay stack of various heights, transporting a hay stack of various heights, and splitting a hay stack to a desired height. Loading haystacks comprised of large bales of hay onto a truck can be difficult and time-consuming. Hay retriever 10 allows an entire haystack to be loaded in a single motion. The base frame 100 and carriage assembly 300 are rotated from the substantially horizontal first position to the substantially vertical second position. The vehicle 50 then backs up until the arms 205 of the fork assembly 200 are on opposite sides of the haystack. The arms 205 are moved laterally inward such that each of the L-shaped arms 205 is on an opposite bottom corner of the haystack. The base frame 100 and carriage assembly 300 are rotated back slightly. In an embodiment with a moveable rear wall frame 400, the rear wall frame 400 moves from a first rear wall frame position toward the second rear wall frame position until the rear wall frame 400 abuts the top of the haystack. In addition, or alternatively, the arms 205 are moved away from the first fork assembly position 250 lifting the haystack toward the rear wall frame 400. The cords are then attached to the ends of the arms 205 and adjusted to the appropriate length of approximately the height of the haystack. The base frame 100 and carriage assembly 300 are then returned to the substantially horizontal first position, 150 and 350 respectively. The haystack may be transported to its new destination.

To unload the haystack, the base frame 100 and carriage assembly are rotated to the substantially vertical second position, and the arms 205 return to the first fork assembly position such that the haystack is on the ground. The arms 205 then move laterally outward and the rear wall frame 400 returns to the first rear wall frame position such that the haystack is standing without support of the hay retriever 10.

The hay retriever 10 may also split haystacks into smaller haystacks. The carriage assembly 300 rotates to the substantially vertical second carriage position while the base frame 100 remains in the substantially horizontal first frame position. The arms 205 are lifted toward the second fork assembly position 255 away from the base plate 305 until the arms 205 are even with the desired splitting location of the haystack.

The vehicle 50 then backs up such that the arms 205 are on opposite sides of the haystack. The arms 205 move laterally inward until the arms 205 have wedged into the haystack. The arms 205 are lifted higher to split the haystack. This smaller haystack may be moved to a new desired location.

At the new desired location the arms 205 are lowered until the haystack is on the ground and the arms 205 are then moved laterally outward such that the haystack is standing without support of the hay retriever 10. The carriage assembly 300 is returned to the substantially horizontal first carriage position.

It will be understood that implementations are not limited to the specific components disclosed herein, as virtually any components consistent with the intended operation of a method and/or system implementation for hay retrievers may be utilized. Accordingly, for example, although particular hydraulic systems, frames, pivot elements, and arms may be disclosed, such components may comprise any shape, size, style, type, model, version, class, grade, measurement, concentration, material, weight, quantity, and/or the like consistent with the intended operation of a method and/or system implementation for a hay retriever may be used.

In places where the description above refers to particular implementations of a hay retriever, it should be readily apparent that a number of modifications may be made without departing from the spirit thereof and that these implementations may be applied to other hay retrievers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A hay retrieving apparatus for use with a vehicle, comprising:
    a base frame, the base frame comprising a rear member and two side members each coupled to substantially opposing ends of the rear member;
    a rear wall frame coupled to the base frame proximate the rear member;
    at least one pivot element coupled to the side members distal to the rear member, the pivot element configured to pivotally couple the base frame to a vehicle frame such that the base frame is pivotable between a substantially horizontal first frame position and a substantially vertical second frame position;
    a carriage assembly configured to pivotally couple to the vehicle frame proximate the pivot elements and pivot between a substantially horizontal first carriage position and a substantially vertical second carriage position when pivotally coupled to vehicle frame, wherein the carriage assembly is configured to pivot with the base frame, to pivot independent of the base frame, or both, when the carriage assembly and the base frame are coupled to the vehicle frame;
    a fork assembly coupled to the carriage assembly, the fork assembly comprising two opposing arms perpendicular to the carriage assembly, wherein the fork assembly is configured to move the two opposing arms directionally closer in and farther out from each other; and
    a locking mechanism configured to lock the carriage assembly to the base frame such that the carriage assembly and base frame pivot jointly;
    wherein at least the fork assembly is movably coupled to the carriage assembly or the rear wall frame is movably coupled to the base frame, such that a distance between the rear wall frame and the arms of the fork assembly is increased or decreased when either the fork assembly or the rear wall frame is moved and the carriage assembly is substantially parallel to the side members.

2. The hay retrieving apparatus of claim 1, wherein the rear wall frame is fixed and the fork assembly is movably coupled to the carriage assembly and the at least one pivot element comprises two pivot elements.

3. The hay retrieving apparatus of claim 1, wherein:
    the carriage assembly comprises two carriage frame members; and
    the fork assembly comprises a fork body slidably coupled to the carriage assembly and two hydraulic elements coupled to the fork body, each hydraulic element coupled to a different arm of the two opposing arms, wherein the fork assembly is configured to move the two opposing arms from a first position proximate a first end of the carriage assembly to a second position closer to a second end of the carriage assembly.

4. The hay retrieving apparatus of claim 3, wherein the carriage assembly further comprises two extension frame members coupled by a cross brace, each extension frame member slidably coupled to a different carriage frame member such that the extension frame members are movable between an extended position and an unextended position.

5. The hay retrieving apparatus of claim 4, wherein the fork body is slidably coupled to the extension frame members and the carriage assembly further comprises a carriage hydraulic element coupled to the carriage assembly between the carriage frame members and configured to move the fork body along the extension frame members.

6. The hay retrieving apparatus of claim 3, wherein the fork assembly second position is configured to split a haystack by lifting an upper portion of the haystack without lifting a lower portion of the haystack.

7. The hay retrieving apparatus of claim 1, further comprising at least one frame hydraulic element coupled to the carriage assembly and configured to couple to the vehicle frame such that the at least one frame hydraulic element pivots the carriage assembly when the carriage assembly and the at least one frame hydraulic element are coupled to the vehicle frame.

8. A hay retrieving apparatus, comprising:
    a base frame, the base frame comprising a rear member and two side members each coupled to opposing ends of the rear member;
    a rear wall frame coupled to the base frame proximate the rear member;
    at least two pivot elements each coupled to a different side member opposite the rear member, the pivot elements each configured to pivotally couple the base frame to a vehicle frame of the vehicle and pivotable between a substantially horizontal first frame position and a substantially vertical second frame position;
    a fork assembly configured to pivotally couple to the vehicle frame and movable to increase or decrease a distance between the rear wall frame and the fork assembly, the fork assembly comprising a fork body, two extension members coupled to the fork body, and two arms each coupled to a different extension member, wherein the extension members are configured to move the two opposing arms directionally closer to and further from each other;

a carriage assembly configured to pivotally couple to the vehicle frame proximate the pivot elements and pivot between a substantially horizontal first carriage position to a substantially vertical second carriage position, wherein the carriage assembly is configured to pivot with the base, to pivot independent of the base, or both, when the carriage assembly and the base frame are coupled to the vehicle frame; and a locking mechanism configured to lock the carriage assembly to the base frame such that the carriage assembly and base frame pivot jointly.

9. The hay retrieving apparatus of claim 8, wherein the fork body is slidably coupled to the carriage assembly.

10. The hay retrieving apparatus of claim 9, wherein the carriage assembly comprises and extendable carriage assembly.

11. The hay retrieving apparatus of claim 10, wherein the carriage assembly further comprises a carriage hydraulic element configured to extend the extendable carriage assembly and move the fork body.

12. The hay retrieving apparatus of claim 8, further comprising at least one frame hydraulic element coupled to the carriage assembly and configured to couple to the vehicle frame such that the at least one frame hydraulic element pivots the carriage assembly when the carriage assembly and the at least one frame hydraulic element are coupled to the vehicle frame.

13. The hay retrieving apparatus of claim 8, wherein the fork assembly is movable between a first position proximate a first end of the carriage assembly and a second position closer to a second end of the carriage assembly.

14. A hay retriever, comprising:
a base frame, the base frame comprising a rear member and at least two side members coupled to the rear member;
a rear wall frame coupled to the base frame proximate the rear member;
at least one pivot element coupled to the side members distal to the rear member, the pivot element configured to pivotally couple the base frame to a vehicle frame such that the base frame is pivotable between a substantially horizontal first frame position and a substantially vertical second frame position;

a carriage assembly pivotally coupled to the vehicle frame proximate the at least one pivot element such that the carriage assembly is pivotable between a substantially horizontal first carriage position and substantially vertical second carriage position, wherein the carriage assembly is configured to pivot with the base frame, to pivot independent of the base frame, or both;
a fork assembly movably coupled to the carriage assembly, the fork assembly comprising two opposing arms perpendicular to the carriage assembly, wherein the fork assembly is movable between a first position proximate a first end of the carriage assembly and a second position closer to a second end of the carriage assembly; and
a lifting element coupled to the vehicle frame and carriage assembly, the lifting element configured to pivot the base frame and carriage assembly;
wherein the carriage assembly comprises an extendable carriage assembly and the hay retriever comprises a releasable locking mechanism configured to lock the carriage assembly to the base.

15. The hay retriever of claim 14, wherein the fork assembly comprises extendable members configured to move the two opposing arms directionally closer to and further from each other.

16. The hay retriever of claim 15, wherein the lifting element and the extendable members each comprise hydraulic elements.

17. The hay retriever of claim 14, wherein the fork assembly second position is configured to split a haystack by lifting an upper portion of the haystack without lifting a lower portion of the haystack.

18. The hay retrieving apparatus of claim 14, wherein the fork assembly is configured to move the two opposing arms directionally closer in and farther out from each other.

19. The hay retrieving apparatus of claim 14, wherein the rear wall frame is fixed and the fork assembly is movably coupled to the carriage assembly and the at least one pivot element comprises two pivot elements.

20. The hay retrieving apparatus of claim 13, wherein the fork assembly second position is configured to split a haystack by lifting an upper portion of the haystack without lifting a lower portion of the haystack.

* * * * *